Aug. 5, 1924.
R. K. SLAYMAKER ET AL
VENTILATOR
Filed Nov. 7, 1921
1,503,607
2 Sheets-Sheet 1
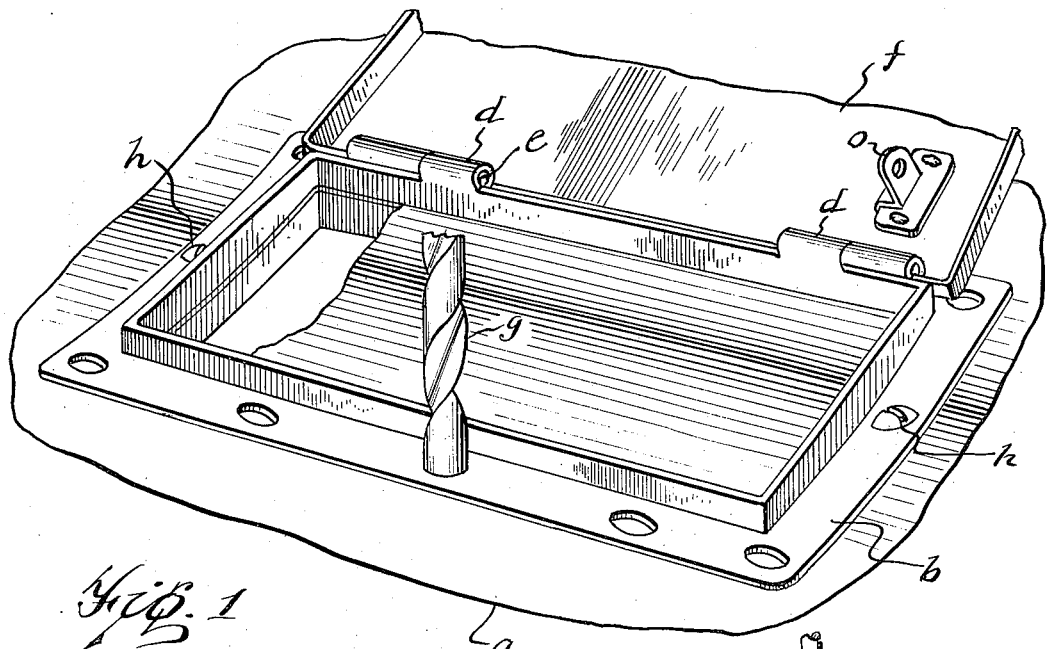
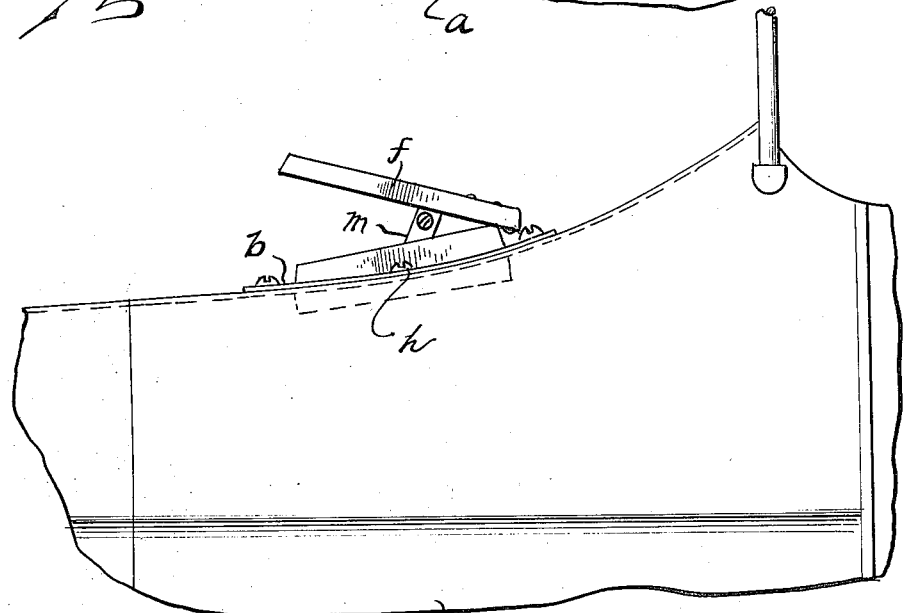
INVENTOR.
Robert K. Slaymaker
George D. Slaymaker
Thomas N. Bourke
BY
Stuart B Barnes
ATTORNEY.

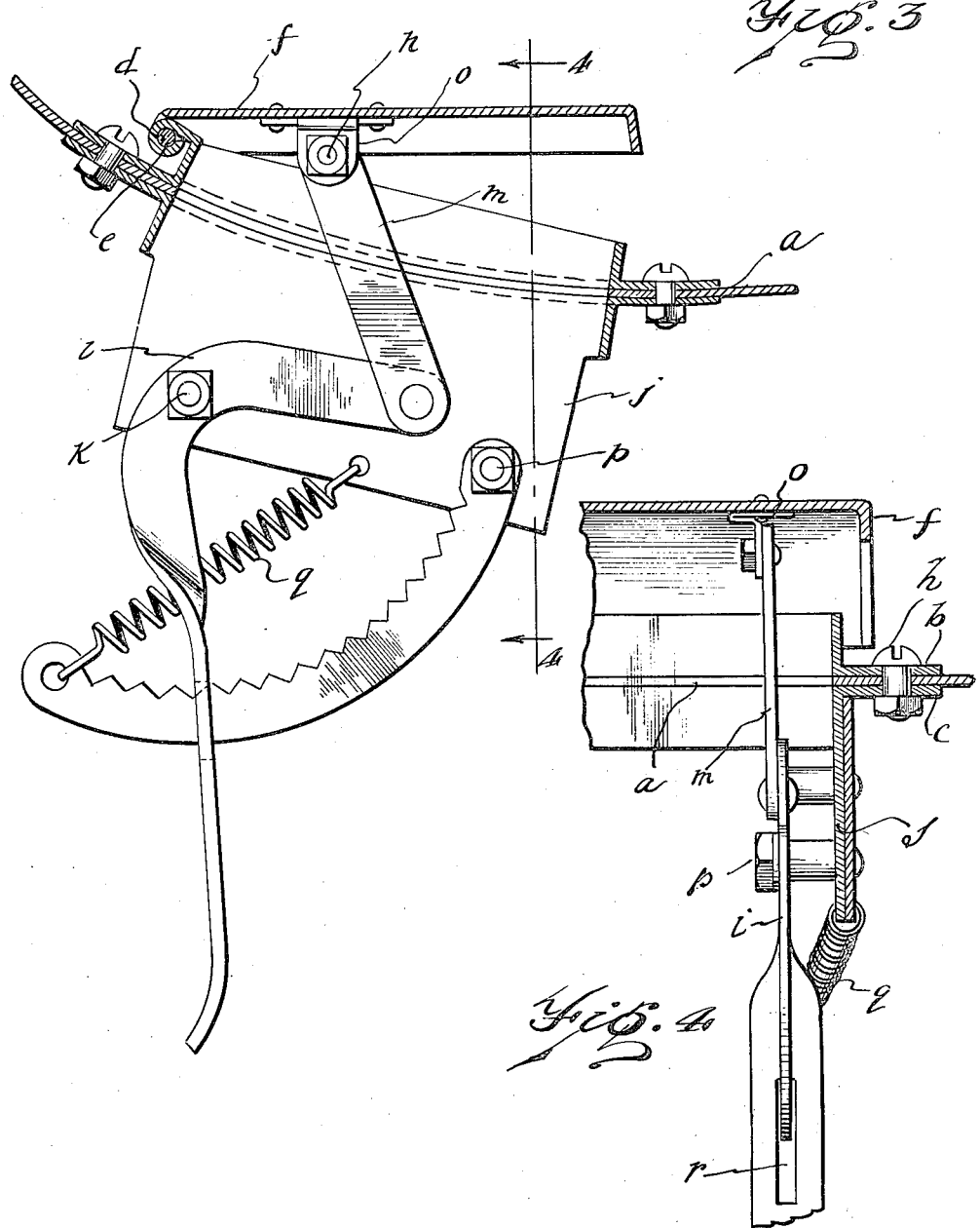

Patented Aug. 5, 1924.

1,503,607

UNITED STATES PATENT OFFICE.

ROBERT K. SLAYMAKER, GEORGE D. SLAYMAKER, AND THOMAS N. BOURKE, OF DETROIT, MICHIGAN, ASSIGNORS TO SLAYMAKER ELECTRIC WELDING COMPANY, OF DETROIT, MICHIGAN, A CORPORATION OF MICHIGAN.

VENTILATOR.

Application filed November 7, 1921. Serial No. 513,284.

*To all whom it may concern:*

Be it known that we, ROBERT K. SLAYMAKER, GEORGE D. SLAYMAKER, and THOMAS N. BOURKE, citizens of the United States, residing at Detroit, in the county of Wayne and State of Michigan, have invented certain new and useful Improvements in Ventilators, of which the following is a specification.

This invention relates to ventilators for use on vehicles, especially automobiles. It has for its object primarily a ventilator that can be installed on an automobile body that has not been originally designed for a ventilator.

The frame of the ventilator is designed to act as a jig to aid in the installation of the device on the cowl of the car or any other place it is desired to place the same. Furthermore, this frame is designed to support the lever and the locking devices by which the lever can be adjusted to various positions for opening of the ventilator lid. These features will more fully appear in the description following.

In the drawings,—

Fig. 1 is a perspective showing how the ventilator frame is temporarily bolted to the cowl to act as a jig in drilling the bolt holes and in cutting out the cowl.

Fig. 2 is a side elevation of the cowl, fragmentary in character, showing the ventilator in place.

Fig. 3 is a fragmentary vertical cross section through the cowl and the ventilator.

Fig. 4 is a fragmentary longitudinal section through the cowl and a portion of the ventilator, taken on the line 4—4 of Fig. 3.

*a* designates the usual cowl of an automobile body. This cowl is usually curved. Therefore, it is desirable that the flanges *b* and *c* of the ventilator frame be slightly flexible to permit the frame to adjust itself to cowls having curves of slightly differing radii. The cowl frame is made up of a pair of angle frames which may be stamped out of a single piece or may be several stamped pieces united, or for that matter, they might be castings, but of course, then the flanges would not be flexible. The upper frame is provided with a pair of knuckles *d*, *d* adapted to take the hinge pin *e* which hinges the stamped metal lid *f* thereto.

Either before the lid is secured to the frame or after the same is secured to the frame and turned back the upper and lower frames may be bolted to the cowl, as shown in Fig. 1, by simply making two separated holes through the cowl and placing the end bolts *h*, for instance, in place. This temporarily makes a jig out of the two frames which acts both as a drill jig and a cutting jig. *g* designates a drill being used to drill holes with the two frames used as a jig. When these holes have been cut the remaining bolts and nuts may be put in place and the two jigs tightly clamped together. Then a cold chisel may be used to cut out the metal enclosed in the frame, or a saw, but it will be found easier to do it with a cold chisel.

An additional function of the lower frame is to carry the operating lever *i*. One end of the lower frame has a depending supporting plate *j*, to which this lever may be bolted as at *k* after the metal in the cowl has been cut away. The load end of the lever has a link *m* riveted to it and this may be bolted as at *n* to the clip *o* on the bottom of the ventilator lid *f*.

A pivoted segment may be bolted to the supporting plate *j* at *p* and a pull spring *q* attached to the opposite end of the segment and also to a hole through the supporting plate *j*. This is a toothed segment and it passes through a slot *r* in the lever. The teeth have gradual slopes so that by simply swinging the lever the segment is forced down against the spring action of the spring *q* to permit the opening and closing of the ventilator. However, the weight of the ventilator acting back through the lever is not sufficient to force the segment down against the spring action and consequently the ventilator will hold in any given position of adjustment. This form of operating lever and holding device is both effective and cheap to manufacture and makes a very easy device to install on the ventilator frame after the frame has done its work as a jig.

What we claim is:

1. A ventilator for installation on a sheet metal structure, having in combination, an upper frame and a lower frame with central openings in which the inside outlines of the frames register whereby the frames can be bolted together on opposite sides of the sheet metal to act as a jig in cutting out the sheet metal, and a lid pivotally supported to act as a closure for the upper frame.

2. A ventilator for installation on a sheet metal structure, having in combination, an upper frame and a lower frame with central openings in which the inside outlines of the frames register whereby the frames can be bolted together to act as a jig in cutting out the sheet metal clamped between the two frames, a lid pivoted to the upper frame, and an operating and holding device secured to the lower frame and the operating device also to the lid.

3. A ventilator for installation on a sheet metal structure, having in combination, a pair of frames having accurately registering central openings and that can be bolted on opposite sides of the sheet metal to act as a drill jig and a cutting jig in removing a part of the sheet metal, a lid hinged to the upper frame, and an operating and holding means supported on the lower frame and connected to the lid.

4. A ventilator for installation on a sheet metal structure, having in combination, an upper frame and a lower frame having central openings with registering boundaries and that can be bolted to opposite sides of the sheet metal to act as a jig to facilitate the removal of a portion of the sheet metal, a lid hinged to the upper frame, and an operating and holding device detachably secured to the lower frame and the operating member of which may be detachably secured to the lid after the metal has been removed.

5. A ventilator for installation on a sheet metal structure, having in combination, a pair of frames that may be bolted to opposite sides of the sheet metal to act as jigs in removing the sheet metal for the ventilating opening, a lid hinged to the upper frame, and an operating lever and segment detachably secured to the lower frame and said lever connected with the lid of the ventilator.

6. A ventilator, having in combination, a pair of frames that may be bolted together, the under frame provided with a depending supporting plate, a lid hinged to the upper frame, an operating lever pivoted to said supporting plate and connected with the lid, and means supported on said supporting plate by which the operating lever may be held in various positions of adjustment.

In testimony whereof we affix our signatures.

ROBERT K. SLAYMAKER.
GEORGE D. SLAYMAKER.
THOMAS N. BOURKE.